United States Patent
Takahashi et al.

(10) Patent No.: US 10,282,318 B2
(45) Date of Patent: May 7, 2019

(54) IMAGE PROCESSING APPARATUS, METHOD OF CONTROLLING IMAGE PROCESSING APPARATUS, AND RECORDING MEDIUM

(71) Applicant: Konica Minolta, Inc., Tokyo (JP)

(72) Inventors: Kenichi Takahashi, Osaka (JP); Kaitaku Ozawa, Nishinomiya (JP); Masao Hosono, Itami (JP); Tomoaki Nakajima, Kobe (JP); Toshikazu Kawaguchi, Kobe (JP); Daisuke Nakano, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/782,693

(22) Filed: Oct. 12, 2017

(65) Prior Publication Data

US 2018/0107613 A1    Apr. 19, 2018

(30) Foreign Application Priority Data

Oct. 17, 2016    (JP) .................................. 2016-203305

(51) Int. Cl.
*G06F 13/16*    (2006.01)
*G06F 13/12*    (2006.01)
*G06F 13/40*    (2006.01)

(52) U.S. Cl.
CPC ........ *G06F 13/1605* (2013.01); *G06F 13/128* (2013.01); *G06F 13/4031* (2013.01)

(58) Field of Classification Search
CPC . G06F 13/1605; G06F 13/128; G06F 13/4031
See application file for complete search history.

(56) References Cited

U.S. PATENT DOCUMENTS

| 5,142,667 A * | 8/1992 | Dimperio ........... H04N 1/00954 |
| | | 358/1.16 |
| 2009/0244633 A1* | 10/2009 | Johnston ................ H04N 1/648 |
| | | 358/3.23 |
| 2009/0315903 A1* | 12/2009 | Ishikawa ............ H04N 1/00912 |
| | | 345/530 |

(Continued)

FOREIGN PATENT DOCUMENTS

JP    2009-271944 A    11/2009

*Primary Examiner* — Yu Chen
(74) *Attorney, Agent, or Firm* — BakerHostetler

(57) ABSTRACT

An image processing apparatus includes a plurality of memories and a hardware processor which controls an execution operation of a first function including an image processing function and an execution operation of a second function including a server function, by using the plurality of memories. The hardware processor estimates a required bandwidth which is a memory bandwidth required for the execution operation of the first function on the basis of a current operation mode of the image processing apparatus among a plurality of operation modes of the image processing apparatus, and determines a bandwidth securing channel for first function which is a channel capable of being used for the execution operation of the first function and incapable of being used for the execution operation of the second function, out of a plurality of channels used to access the plurality of memories, on the basis of the required bandwidth.

22 Claims, 11 Drawing Sheets

(56) References Cited

U.S. PATENT DOCUMENTS

| | | | | |
|---|---|---|---|---|
| 2013/0246727 A1* | 9/2013 | Hikono | ............... | G06F 12/14 |
| | | | | 711/163 |
| 2013/0254444 A1* | 9/2013 | Gyobu | ............... | G06F 13/364 |
| | | | | 710/110 |
| 2014/0059550 A1* | 2/2014 | Yoshihara | ............... | G06F 9/46 |
| | | | | 718/100 |
| 2014/0086070 A1* | 3/2014 | Saund | ............... | G06F 13/1605 |
| | | | | 370/252 |
| 2014/0095740 A1* | 4/2014 | Ozawa | ............... | G06F 11/3034 |
| | | | | 710/18 |
| 2014/0237148 A1* | 8/2014 | Gyobu | ............... | G06F 13/364 |
| | | | | 710/110 |
| 2015/0189121 A1* | 7/2015 | Shinya | ............... | H04N 1/32448 |
| | | | | 358/1.13 |
| 2015/0277835 A1* | 10/2015 | Matsuda | ............... | G06F 3/1207 |
| | | | | 358/1.15 |
| 2016/0261759 A1* | 9/2016 | Yanase | ............... | H04N 1/00204 |
| 2017/0083262 A1* | 3/2017 | Gadelrab | ............... | G06F 3/0613 |

* cited by examiner

Fig.4

| OPERATION MODE | | REQUIRED BANDWIDTH | USED MEMORY (USED CHANNEL) | | REMARKS |
|---|---|---|---|---|---|
| | | | MFP PROCESS | SERVER PROCESS | |
| OPERATION MODE D1 | STANDBY | 0.2 GB/s | DRAM51a (Ch1) | DRAM 51a,51b,51c,51d (Ch1,Ch2,Ch3,Ch4) | DRAM51a: BAND CONTROL |
| OPERATION MODE D2 | PANEL OPERATION | 0.5 GB/s | DRAM51a (Ch1) | DRAM 51b,51c,51d (Ch2,Ch3,Ch4) | SEPARATION OF USED MEMORIES BY MMU |
| OPERATION MODE D3 | PRINT OPERATION | 1.5 GB/s | DRAM51a,51b (Ch1,Ch2) | DRAM51c,51d (Ch3,Ch4) | SEPARATION OF USED MEMORIES BY MMU |
| OPERATION MODE D4 | SCAN OPERATION | 2.5 GB/s | DRAM 51a,51b,51c (Ch1,Ch2,Ch3) | DRAM51d (Ch4) | SEPARATION OF USED MEMORIES BY MMU |
| OPERATION MODE D5 | COMPOSITE OPERATION | 3.2 GB/s | DRAM 51a,51b,51c,51d (Ch1,Ch2,Ch3,Ch4) | DRAM51d (Ch4) | DRAM51d: BAND CONTROL |

Fig. 10

| | FIRST ELEMENT | SECOND ELEMENT | THIRD ELEMENT | FOURTH ELEMENT | FIFTH ELEMENT |
|---|---|---|---|---|---|
| COPY | SIZE AND ORIENTATION OF ORIGINAL MANUSCRIPT | SIZE AND ORIENTATION OF OUTPUT PAPER | ZOOM (×0.7/ ×1.0/ ×1.4) | COLOR MODE (FULL COLOR / MONOCHROME) | ORIGINAL MANUSCRIPT MODE (TEXT /PICTURE /MAP) |
| SCAN | SIZE AND ORIENTATION OF ORIGINAL MANUSCRIPT | SIZE AND ORIENTATION OF TRANS-MISSION | RESOLUTION (600dpi/ 300dpi) | COLOR MODE (FULL COLOR / MONOCHROME/ BINARY) | TRANSMISSION FORMAT (RAW/ JPEG/ PDF) |
| PRINT | SIZE AND ORIENTATION OF ORIGINAL MANUSCRIPT | SIZE AND ORIENTATION OF OUTPUT PAPER | RESOLUTION (1200dpi/ 600dpi) | COLOR MODE (FULL COLOR / MONOCHROME) | IMAGE QUALITY (HIGH / MIDDLE / LOW) |

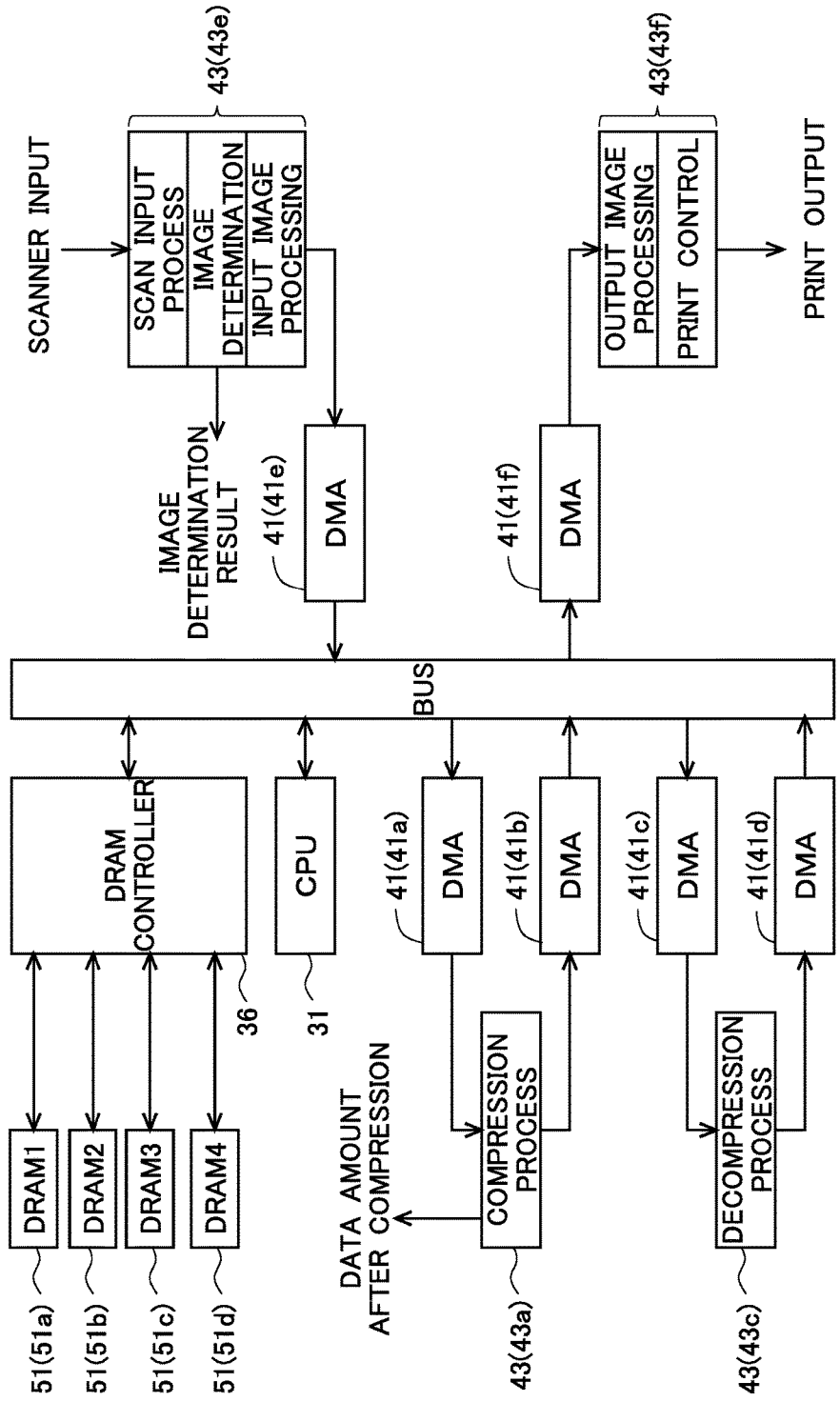

IMAGE PROCESSING APPARATUS, METHOD OF CONTROLLING IMAGE PROCESSING APPARATUS, AND RECORDING MEDIUM

Japanese Patent Application No. 2016-203305 filed on Oct. 17, 2016, including description, claims, drawings, and abstract the entire disclosure is incorporated herein by reference in its entirety.

BACKGROUND

Technological Field

The present invention relates to an image processing apparatus such as an MFP (Multi-Functional Peripheral) and its relevant technique.

Description of the Related Art

There is an image processing apparatus (an MFP or the like) having an image processing function regarding printing, scanning and/or the like.

In recent years, such an image processing apparatus (an MFP or the like) is required to serve as a server device in a network, and there is also an MFP provided with a server function. In this MFP, the server function and the image processing function are achieved simultaneously in parallel in a multitasking OS environment.

Such an MFP, however, has difficulty in being provided with a broadband memory (with large transmission capacity) (and high capacity) that a general server has, because of cost constraint and the like, and only has a memory sufficient to achieve the image processing function for MFP.

In such a device environment, in a case where both an operation regarding the server function of the MFP (also referred to as a server operation) and an operation regarding the image processing function of the MFP (also referred to as an MFP operation) are performed in parallel in the MFP, there arises contention on the memory.

In a case, for example, where the above two operations are performed in parallel while a relatively large memory bandwidth is used for the server operation, the memory bandwidth which can be used for the MFP operation sometimes consequently becomes smaller. As a result, the time required to perform the MFP operation increases and a user's waiting time also increases. In more detail, when a user intends to perform a copy or print operation, the required time becomes longer than usual and the user feels uncomfortable.

Then, it is an object of the present invention to provide a technique capable of effectively using a memory shared by an image processing apparatus which performs a server function and an image processing function in parallel, to thereby suppress a delay in an operation regarding the image processing function.

Japanese Patent Application Laid Open Gazette No. 2009-271944 (Patent Document 1) discloses an arbitration device which is intended to ensure a required bandwidth for two types of access masters, a local concentration access master and a fixed rate access master. When the arbitration device receives an access request not below the bandwidth allocated in advance from the local concentration access master, the arbitration device permits the request in a first period which is set in advance. Then, in a second period after the first period is ended, the access request from the local concentration access master is masked and the access by the fixed rate access master is performed.

The technique disclosed in Patent Document 1, however, does not relate to the contention between the server operation and the MFP operation. Further, even if the MFP operation is performed by the local concentration access master and the server operation is performed by the fixed rate access master in the technique disclosed in Patent Document 1, when the bandwidth for the MFP operation exceeds a certain degree (the bandwidth allocated in advance), it is impossible to ensure the bandwidth for the MFP operation especially after the first period. As a result, the required time for the MFP operation increases and the user's waiting time also increases.

SUMMARY

It is an object of the present invention to provide a technique capable of effectively using a memory shared by an image processing apparatus which performs a server function and an image processing function in parallel, to thereby suppress a delay in an operation regarding the image processing function.

The present invention is intended for an image processing apparatus. According to a first aspect of the present invention, the image processing apparatus includes a plurality of memories and a hardware processor which controls an execution operation of a first function including an image processing function and an execution operation of a second function including a server function, by using the plurality of memories. The image processing apparatus is capable of operating in any of a plurality of operation modes. In the image processing apparatus of the present invention, the hardware processor estimates a required bandwidth which is a memory bandwidth required for the execution operation of the first function on the basis of a current operation mode of the image processing apparatus among the plurality of operation modes, and determines a bandwidth securing channel for first function which is a channel capable of being used for the execution operation of the first function and incapable of being used for the execution operation of the second function, out of a plurality of channels used to access the plurality of memories, on the basis of the required bandwidth.

The present invention is also intended for a method of controlling an image processing apparatus which controls an execution operation of a first function including an image processing function and an execution operation of a second function including a server function by using a plurality of memories. According to a second aspect of the present invention, the method performs a) estimating a required bandwidth which is a memory bandwidth required for the execution operation of the first function on the basis of a current operation mode of the image processing apparatus among a plurality of operation modes of the image processing apparatus and b) determining a bandwidth securing channel for first function which is a channel capable of being used for the execution operation of the first function and incapable of being used for the execution operation of the second function, out of a plurality of channels used to access the plurality of memories, on the basis of the required bandwidth.

The present invention is also intended for a non-transitory computer-readable recording medium. According to a third aspect of the present invention, the non-transitory computer-readable recording medium records therein a computer program which causes a computer controlling the image processing apparatus, to execute the method as defined in the second aspect of the present invention.

According to a fourth aspect of the present invention, the image processing apparatus includes a plurality of memories and a hardware processor which controls an execution operation of a first function including an image processing function and an execution operation of a second function including a server function, by using the plurality of memories. In the image processing apparatus of the present invention, the hardware processor estimates a required bandwidth which is a memory bandwidth required for the execution operation of the first function on the basis of an operation state of a user on the image processing apparatus, and determines a bandwidth securing channel for first function which is a channel capable of being used for the execution operation of the first function and incapable of being used for the execution operation of the second function, out of a plurality of channels used to access the plurality of memories, on the basis of the required bandwidth.

According to a fifth aspect of the present invention, the method performs a) estimating a required bandwidth which is a memory bandwidth required for the execution operation of the first function on the basis of an operation state of a user on the image processing apparatus and b) determining a bandwidth securing channel for first function which is a channel capable of being used for the execution operation of the first function and incapable of being used for the execution operation of the second function, out of a plurality of channels used to access the plurality of memories, on the basis of the required bandwidth.

According to a sixth aspect of the present invention, the non-transitory computer-readable recording medium records therein a computer program which causes a computer controlling the image processing apparatus, to execute the method as defined in the fifth aspect of the present invention.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 4 is a view showing a relation between operation modes of an MFP and channels to be used;

FIG. 10 is a view showing setting contents on each job; and

FIG. 11 is a view schematically showing a processing on a memory access in a copy operation.

DETAILED DESCRIPTION OF EMBODIMENTS

Hereinafter, one or more embodiments of the present invention will be described with reference to the drawings. However, the scope of the invention is not limited to the disclosed embodiments.

<1. The First Preferred Embodiment>
<1-1. Constitution of Image Processing Apparatus>

Figure 1:
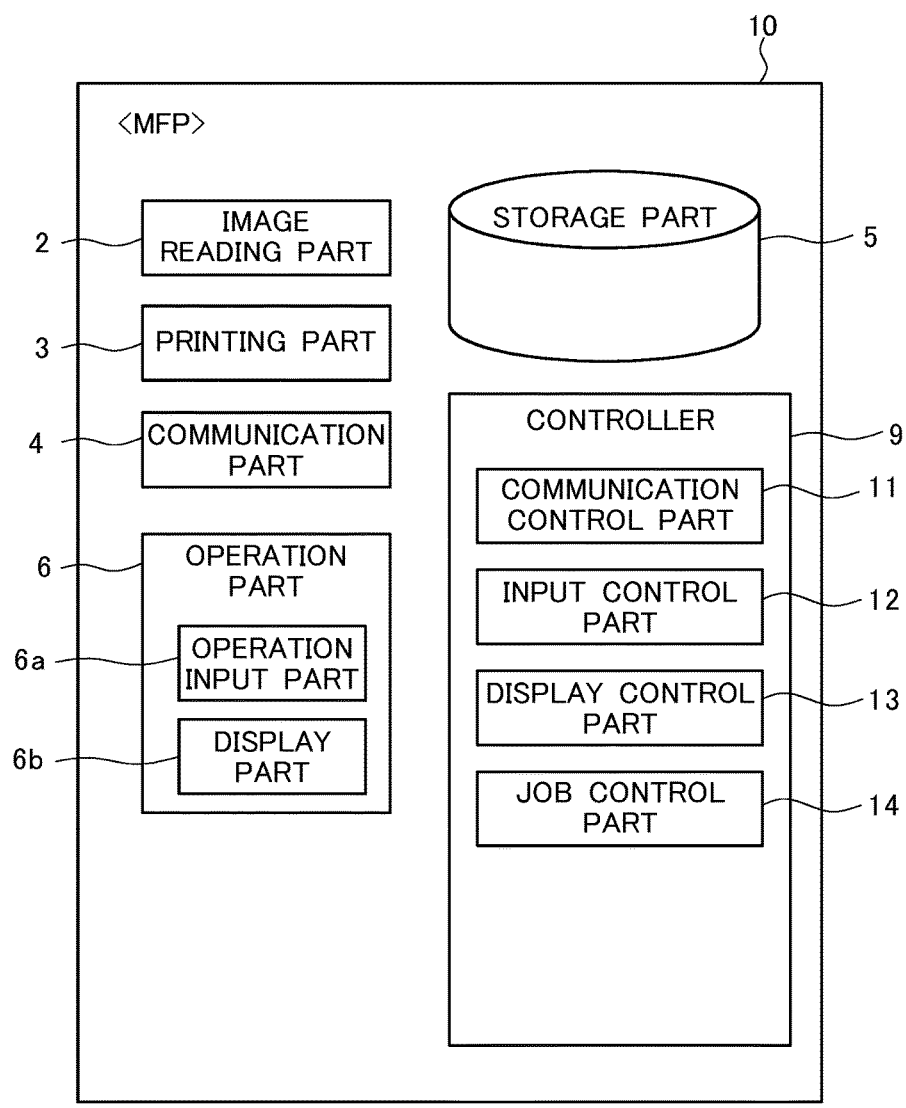
FIG. 1 is a view showing function blocks of an image processing apparatus.
Figure 2:
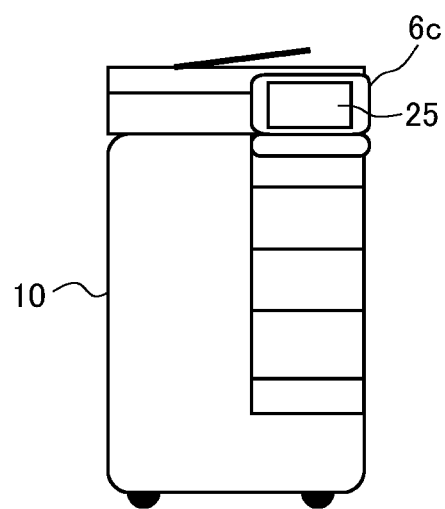
FIG. 2 is a view showing an appearance of the image processing apparatus.

FIG. 1 is a view showing function blocks of an image processing apparatus (in more detail, an MFP) 10. Herein, as the image processing apparatus, exemplarily shown is an MFP (Multi-Functional Peripheral) 10. Further, FIG. 2 is a view showing an appearance of the MFP 10.

The MFP 10 is an apparatus (also referred to as a multifunction machine) having a scanner function, a copy function, a facsimile function, a box storage function, and the like. Specifically, as shown in the functional block diagram of FIG. 1, the MFP 10 comprises an image reading part (image reader) 2, a printing part (printer) 3, a communication part 4, a storage part (storage) 5, an operation part 6, a controller 9, and the like, and multiply uses these constituent parts to implement various functions. The MFP 10 is also referred to as an image forming apparatus or an image processing apparatus.

The image reading part 2 is a processing part which optically reads (in other words, scans) an original manuscript placed on a predetermined position (ADF (Auto Document Feeder) or a glass surface (transparent document platen (original glass) or the like) of the MFP 10 and generates image data of the original manuscript (also referred to as an "original manuscript image" or a "scan image"). The image reading part 2 is also referred to as a scanning part (scanner).

The printing part 3 is an output part which prints out an image to various media such as paper on the basis of the data on an object to be printed.

The communication part 4 is a processing part capable of performing facsimile communication via public networks or the like. Further, the communication part 4 is capable of performing various network communications.

The storage part 5 is a storage unit such as a hard disk drive (HDD) or/and the like.

The operation part 6 comprises an operation input part 6a for receiving an operation input which is given to the MFP 10 and a display part (display) 6b for displaying various information thereon.

The MFP 10 is provided with a substantially plate-like operation panel part (operation panel) 6c (see FIG. 2). The operation panel part 6c has a touch panel 25 (see FIG. 2) on a front surface side thereof. The touch panel 25 serves as part of the operation input part 6a and also serves as part of the display part 6b. The touch panel 25 is a liquid crystal display panel in which various sensors or the like are embedded, and capable of displaying various information thereon and receiving various operation inputs from an operating user (manipulating user).

The controller (control part) 9 (see FIG. 1) is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, also referred to simply as a program) stored in a boot memory (flash memory or the like), to thereby implement various processing parts. Further, the program (in more detail, a group of program modules) may be recorded in one of various portable recording media (in other words, various non-transitory computer-readable recording media), such as a USB memory and the like, and read out from the recording medium to be installed in the MFP 10. Alternatively, the program may be downloaded via a network to be installed in the MFP 10.

Specifically, as shown in FIG. 1, the controller 9 executes the above-described program, to thereby implement various processing parts including a communication control part (communication controller) 11, an input control part (input controller) 12, a display control part (display controller) 13, and a job control part (job controller) 14.

The communication control part 11 is a processing part for controlling a communication operation with other apparatus(es) in cooperation with the communication part 4 and the like. The communication control part 11 has a transmission control part (transmission controller) which controls a transmission operation of various data and a reception control part (reception controller) which controls a reception operation of various data.

The input control part 12 is a control part for controlling an operation inputting operation to the operation input part 6a (the touch panel 25 or the like). For example, the input control part 12 controls an operation for receiving an operation input to an operation screen displayed on the touch panel 25.

The display control part 13 is a processing part for controlling a display operation on the display part 6b (the touch panel 25 or the like).

The job control part 14 is a processing part for controlling operations regarding various jobs (print-out operation, image reading operation, and the like).

<1-2. Detailed Constitution of Controller>

Figure 3:
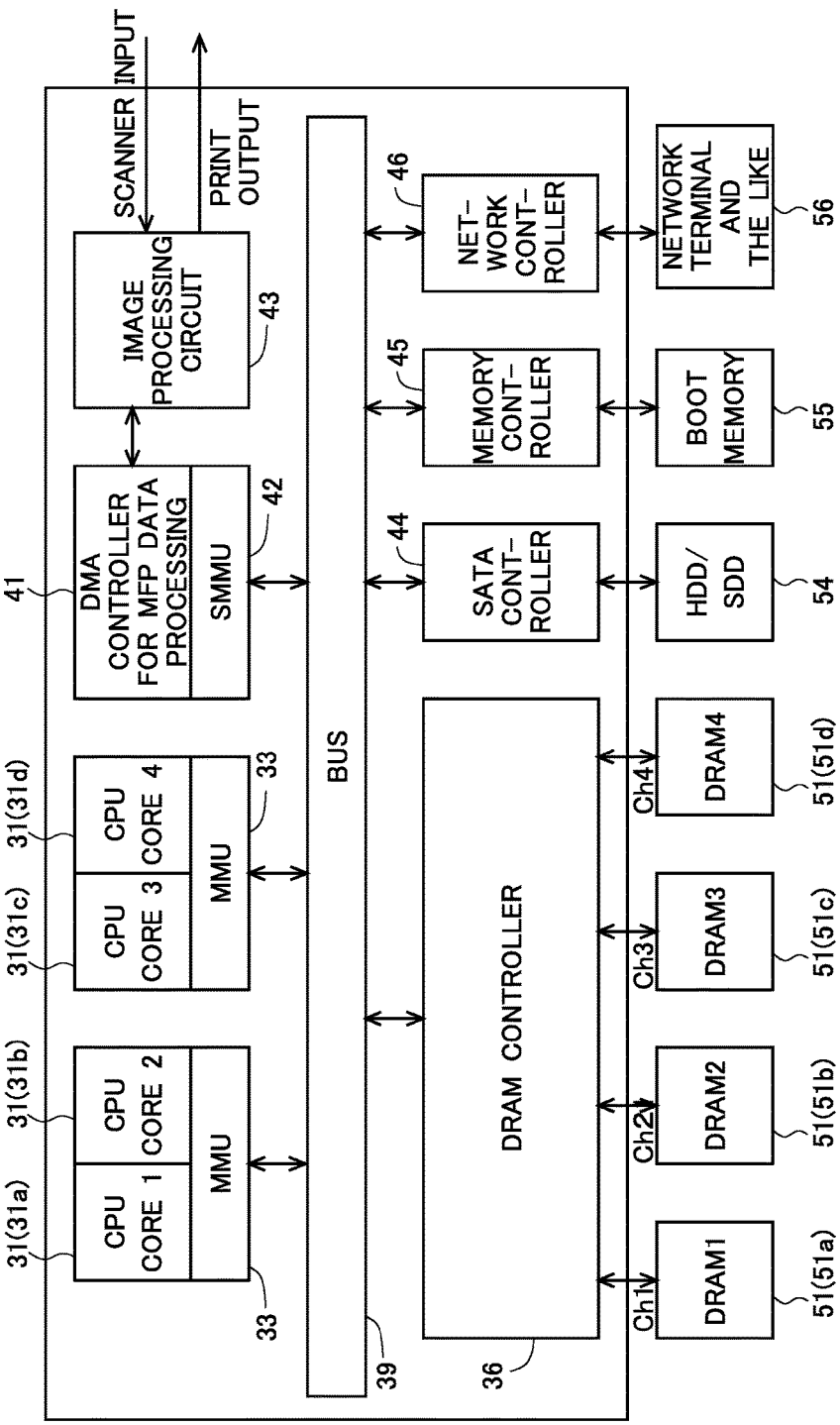
FIG. 3 is a view showing a detailed hardware structure of a controller.

FIG. 3 is a view showing a detailed hardware structure of the controller 9.

In the first preferred embodiment, the controller 9 comprises an SoC (System-on-a-Chip) which accommodates a CPU 31, a DRAM controller 36, and the like in one chip.

The SoC comprises the CPU 31 (in more detail, a plurality of (herein, four) CPU cores 31a to 31d), a plurality of (herein, two) MMUs (Memory Management Units) 33, the DRAM controller 36, a DMA (Direct Memory Access) controller 41, an SMMU (System Memory Management Unit) 42, an image processing circuit 43, an SATA (Serial ATA) controller 44, a memory controller 45, and a network controller 46. The constituent elements 31, 36, 41, 44, 45, and 46 are connected to one another through an internal bus 39 or the like and capable of performing transmission and reception of data to/from one another.

The image processing circuit 43 is capable of performing transmission and reception of data with the constituent elements 31, 36, 44, 45, and 46 through the DMA controller 41 (data processing (image processing) DMA controller for MFP), the SMMU 42, the bus 39, and the like.

Further, the controller 9 comprises a volatile storage part (volatile storage) 51 (in more detail, a plurality of (herein, four) memories (DRAMs (Dynamic Random Access Memories) 51a to 51d) which is capable of performing a high speed operation, a nonvolatile storage part (nonvolatile storage) 54 (HDD (Hard Disk Drive), SSD (Solid State Drive), or the like) of high capacity, a boot memory 55 (flash memory or the like), and the like.

The plurality of DRAMs 51 (in more detail, four DRAMs 51a to 51d) are capable of performing transmission and reception of data with the constituent elements 31, 41, 43, 44, 45, and 46 through the DRAM controller 36 and the bus 39. Further, the four DRAMs 51a to 51d are shared by both an MFP operation (described later) and a server operation (described later).

The nonvolatile storage part 54 is capable of performing transmission and reception of data with the constituent elements 31, 36, 41, 45, and 46 through the SATA controller 44 and the bus 39.

The boot memory 55 is capable of performing transmission and reception of data with the constituent elements 31, 36, 41, 44, 45, and 46 through the memory controller 45 and the bus 39.

The network controller 46 is a processing part which controls external communication through a network terminal 56. The network controller 46 also controls the transmission and reception of data among the constituent elements 31, 36, 41, 44, and 45 through the bus 39. The network controller 46 controls a reception operation of data from an external device and a transfer operation of the data to the inside of the apparatus, a transmission operation of data to the external device (including a transfer operation of the data from the inside of the apparatus), and the like.

Each of the CPU cores 31a to 31d performs an MFP operation (also referred to as an "execution operation of a first function including an image processing function") and a server operation (also referred to as an "execution operation of a second function including a server function"). More specifically, an application software program for performing the MFP operation and an application software program for performing the server operation are executed by the CPU cores 31a to 31d (also referred to as the CPU 31). For example, a process regarding the program for performing the MFP operation (a process to access data on the basis of a direct command from the CPU 31, a process to access data not through the CPU 31 under the control of the DMA controller in the MFP, or the like) is executed by the CPU 31 (the CPU cores 31a to 31d). Further, a process regarding the program for performing the server operation (a server process or the like) is executed by the CPU 31 (the CPU cores 31a to 31d). These various processes can be performed simultaneously in parallel under the control of a multitasking OS.

The MFP operation is an operation accompanied by an image processing performed by the MFP (image processing apparatus), and includes, for example, a print operation, a scan operation, a copy operation, and the like. Further, the server operation is an operation to implement the server function such as a file server function, a web server function, and the like. Furthermore, whether each process is a process for the MFP operation (first function process) or a process for the server operation (second function process) is determined in advance (by a designer of the program or the like) and may be managed by the CPU 31 or the like.

Further, it is assumed herein that a plurality of processes regarding various application software programs (various programs regarding the MFP operation and the server operation) are processed in parallel by a SMP (Symmetrical Multi Processing) mode. In the SMP mode, a plurality of CPUs (or CPU cores) can share one common memory space and share information thereamong. In the SMP mode, each CPU (or CPU core) is handled equally to the other CPUs (or CPU cores) and can perform the same processing as the other CPUs do. For example, each CPU (or CPU core) can perform the process regarding the program for performing the MFP operation and also can perform the process regarding the program for performing the server operation.

In the first preferred embodiment, the DRAM controller 36 has four memory channels Ch1 to Ch4. The DRAM controller 36 can perform transmission and reception of data with each of the four DRAMs 51 through each memory channel (also referred to simply as a channel). Specifically, the DRAM controller 36 can perform transmission and reception of data with the DRAM 51a through the first channel Ch1, and can perform transmission and reception of data with the DRAM 51b through the second channel Ch2.

Similarly, the DRAM controller 36 can perform transmission and reception of data with the DRAM 51c through the third channel Ch3, and can perform transmission and reception of data with the DRAM 51d through the fourth channel Ch4.

In the controller 9, the four DRAMs 51 (51a to 51d) are used as a system memory. In detail, the four DRAMs 51 are mapped in one common memory space to be used. Further, though the four DRAMs 51 (51a to 51d) are mapped at a common physical address, conversion between the physical address and a virtual address is performed by an OS (Operating System) (see FIG. 6). The application side can use the virtual address, and the application side does not usually perform direct use of the physical address. The physical address itself and a conversion process between the physical address and the virtual address are managed by the OS. Further, the conversion process between the physical address and the virtual address are performed by the MMUs 33 (see FIG. 3) and the like under the control of the OS.

<1-3. Access Control of DRAM>

In a case where one DRAM is connected to one channel, a memory bandwidth of the DRAM 51 (transmission capacity in data access to the DRAM) is calculated as follows. When one DRAM, "DDR3 16 bit 1600 Mbps", is connected to one channel, for example, a theoretical memory bandwidth is 3.2 GB/s (gigabytes/second) per one channel. In consideration of various circumstances, however, an actual value (actual transfer bandwidth) of the memory bandwidth usually decreases to about 30 to 50% of the theoretical value. For this reason, it is thought that a memory bandwidth (actual value) per one channel is, for example, about 1.0 GB/s (gigabytes/second).

On the other hand, a memory bandwidth (required bandwidth) required for the MFP operation varies depending on the type of MFP operation or the like. For example, only a relatively small memory bandwidth (for example, 0.2 GB/s) is used during standby of the MFP 10, and conversely a relatively large memory bandwidth (for example, 1.5 GB/s) can be used in the print operation. Further, in the scan operation, a larger memory bandwidth (for example, 2.5 GB/s) can be used.

As shown in FIG. 4, the MFP 10 has exemplary operation modes at a plurality of stages in accordance with operating states of the MFP 10. It can be expressed that the operation modes (herein, operation modes D1 to D5 at five stages) are grouped in accordance with the required bandwidth for each image processing in the MFP 10 (in short, the required bandwidth for the MFP operation).

The operation mode D1 is a mode in which the MFP 10 is in a standby state and also referred to as a "standby mode" of the MFP 10. The operation mode D1 is an operation mode corresponding to a smallest required bandwidth (required bandwidth for the MFP operation). In the operation mode D1, for example, a memory bandwidth of at most 0.2 GB/s is used.

The operation mode D2 is a mode in which an operation using the operation panel part 6c (one of various setting operations (however, except setting operations regarding individual jobs) such as a browser use operation and the like) is performed by the MFP 10 and also referred to as a "panel operation mode". The operation mode D2 is an operation mode corresponding to a required bandwidth larger than that of the operation mode D1 by one stage. In the operation mode D2, for example, a memory bandwidth of at most 0.5 GB/s is used in a browsing operation (in more detail, when a moving image is reproduced) and the like using the touch panel 25 of the operation panel part 6c. When the operation of the operation panel part 6c starts, it is determined that the operation mode has been changed to the operation mode D2. In the operation using the operation panel part 6c, however, when a setting operation regarding scan (and copy) is performed, it is determined that the operation mode has been changed to the operation mode D4 described later. Further, when a no-operation period of the operation panel part 6c continues for a certain period or more, it is determined that the operation mode has been changed from the operation mode D2 to one of the other operation modes (for example, the operation mode D1).

The operation mode D3 is a mode in which a print operation (print job) is performed by the MFP 10 and also referred to as a "print operation mode". The operation mode D3 is an operation mode corresponding to a required bandwidth larger than that of the operation mode D2 by one stage. In the operation mode D3, for example, a memory bandwidth of at most 1.5 GB/s is used. When the MFP 10 receives a print request from a personal computer connected to the MFP 10 in a network, it is determined that the operation mode has been changed to the operation mode D3. In other words, at the point in time after the print request is received and before print data (described next) is received, it is determined that the operation mode has been changed to the operation mode D3. After that, a reception operation of the print data (print data described in a page description language (PDL)), a print-out operation based on the print data, and the like are performed in the operation mode D3. When the print-out operation is completed, it is determined that the operation mode has been changed from the operation mode D3 to one of the other operation modes.

The operation mode D4 is a mode in which a scan operation (a job (a scan job, a copy job, or the like) which scans an original manuscript and generates a scan image) is performed by the MFP 10 and also referred to as a "scan operation mode". The operation mode D4 is an operation mode corresponding to a required bandwidth larger than that of the operation mode D3 by one stage. In the operation mode D4, for example, a memory bandwidth of at most 2.5 GB/s is used. When a setting operation regarding the scan job, an operation of putting an original manuscript on an ADF or the like, or the like is detected (before an execution start command of the scan job (press of a start button) is received), it is determined that the operation mode has been changed to the operation mode D4. After that (after the start button is pressed), the scan job (a scan image generation process (an image reading process, an image compression process, and the like), a network transmission process, a print-out process, and/or the like) are performed in the operation mode D4. When the scan job is completed, it is determined that the operation mode has been changed from the operation mode D4 to one of the other operation modes. Further, in the scan operation mode D4, various operations (a scan distribution operation (an operation of generating the scan image and distributing the scan image through the network or the like), the copy operation, and the like) accompanied by the scan process are performed.

The operation mode D5 is a mode in which a composite operation of two or more operations (for example, two operations of the copy operation and a network print operation (a print reception operation or the like)) is performed in parallel by the MFP 10 and also referred to as a "composite operation mode". The operation mode D5 is an operation mode corresponding to a required bandwidth larger than that of the operation mode D4 by one stage. In the operation mode D5, for example, a memory bandwidth of at most 3.2 GB/s is used. When one MFP operation (for example, the copy operation) is being performed and another MFP operation (for example, a reception operation of print data) is started, it is determined that the operation mode has been changed to the operation mode D5. Further, when the composite operation is performed in the operation mode D5 and then at least one operation out of the composite operation is completed and the state returns to a state where only a single operation is performed, it is determined that the operation mode has been changed from the operation mode D5 to one of the other operation modes (for example, the operation mode D3).

In the first preferred embodiment, in consideration of such circumstances, a memory bandwidth (required bandwidth) required for the MFP operation in the current operation mode is estimated on the basis of the current operation mode of the MFP 10 among these operation modes at the plurality of stages (five stages). In more detail, the maximum value of the memory bandwidth required for the MFP operation in the current operation mode is estimated as the "required bandwidth". Then, on the basis of the estimated "required bandwidth", a channel (also referred to as a "channel for MFP operation" or a "channel for first function") which can be used for the MFP operation is determined in advance (before the memory is actually used) out of the plurality of channels Ch1 to Ch4. Further, a channel (also referred to as a "channel for server operation" or a "channel for second function") which can be used for the server operation is also determined. Preferably, the "channel for MFP operation" and the "channel for server operation" are determined before a new job (the scan job, the copy job, the print job, or the like) regarding the first function is performed (at the point in time before the start button is pressed, at the point in time after the print request is received and before the print data is received, or the like). In other words, these channels are determined before the execution of the image processing or the like regarding each job is started. Further, these operations (the estimation operation and the determination operation) are performed by the CPU 31 and the like. Furthermore, herein, one DRAM is associated to one channel, and the assignment of one DRAM is equivalent to the assignment of one channel.

More specifically, when it is determined that the operation mode of the MFP 10 is the (second) operation mode D2, one DRAM 51a (in other words, one channel Ch1) is assigned to the MFP operation. Since the memory bandwidth (actual value) of the one channel Ch1 is 1.0 GB/s, the required bandwidth (0.5 GB/s) for the operation mode D2 (the required bandwidth for the MFP operation) is ensured by this assignment. Further, the other three DRAMs 51b, 51c, and 51d (in other words, the three channels Ch2, Ch3, and Ch4) are assigned to the server operation. In the operation mode D2, the plurality of channels are exclusively assigned to the MFP operation and the server operation. In other words, to the MFP operation, the channel Ch1 which cannot be used for the server operation is assigned. It is thereby possible to suppress the effect that the server operation produces on the MFP operation.

Further, since the channel Ch1 is a channel used exclusively for the MFP operation among the MFP operation and the server operation (channel which cannot be used for the server operation), the channel Ch1 is also referred to as a "MFP operation only channel" or a "first function only channel". Further, since the channels Ch2, Ch3, and Ch4 are channels used exclusively for the server operation among the server operation and the MFP operation (channels which cannot be used for the MFP operation), the channels Ch2, Ch3, and Ch4 are also referred to as "server operation only channels" or "second function only channels". Herein, the MFP operation "only" (channel) or the server operation "only" (channel) means that the channel is used only for one of the MFP operation and the server operation and can be used for any operation other than these operations. Further, since the "first function only channel" (or the "MFP operation only channel") is a channel to ensure the bandwidth for the first function (or the MFP operation), the channel is also referred to as a "bandwidth securing channel for first function" (or a "bandwidth securing channel for MFP operation"). Similarly, since the "second function only channel" (or the "server operation only channel") is a channel to ensure the bandwidth for the second function (or the server operation), the channel is also referred to as a "bandwidth securing channel for second function" (or a "bandwidth securing channel for server operation").

Furthermore, when it is determined that the operation mode of the MFP 10 is the operation mode D3, two DRAMs 51a and 51b (in other words, two channels Ch1 and Ch2) are assigned to the MFP operation. Since the total memory bandwidth (actual value) of the two channels Ch1 and Ch2 is 2.0 GB/s, the required bandwidth (1.5 GB/s) for the operation mode D3 (the required bandwidth for the MFP operation) is ensured by this assignment. Further, the other two DRAMs 51c and 51d (in other words, the two channels Ch3 and Ch4) are assigned to the server operation. In the operation mode D3, the plurality of channels are exclusively assigned to the MFP operation and the server operation. In other words, to the MFP operation, the channels Ch1 and Ch2 ("MFP operation only channels") which cannot be used for the server operation are assigned. It is thereby possible to suppress the effect that the server operation produces on the MFP operation.

Further, when it is determined that the operation mode of the MFP 10 is the operation mode D4, three DRAMs 51a, 51b, and 51c (in other words, three channels Ch1, Ch2, and Ch3) are assigned to the MFP operation. Since the total memory bandwidth (actual value) of the three channels Ch1, Ch2, and Ch3 is 3.0 GB/s, the required bandwidth (2.5 GB/s) for the operation mode D4 (the required bandwidth for the MFP operation) is ensured by this assignment. Further, the other one DRAM 51d (in other words, the one channel Ch4) is assigned to the server operation. In the operation mode D4, the plurality of channels are exclusively assigned to the MFP operation and the server operation. In other words, to the MFP operation, the channels Ch1, Ch2, and Ch3 ("MFP operation only channels") which cannot be used for the server operation are assigned. It is thereby possible to suppress the effect that the server operation produces on the MFP operation.

Furthermore, when it is determined that the operation mode of the MFP 10 is the operation mode D5, four DRAMs 51a, 51b, 51c, and 51d (in other words, four channels Ch1, Ch2, Ch3, and Ch4) are assigned to the MFP operation. The DRAM 51d (the channel Ch4), however, is also assigned to the server operation. Specifically, in the operation mode D5, the three channels Ch1, Ch2, and Ch3 are the "MFP operation only channels" and the other one channel Ch4 (in other words, the DRAM 51d) is shared by the MFP operation and the server operation. As to the channel Ch4 (the DRAM 51d) which is shared, an arbitration operation for determining the priority of each process (an MFP operation process, a server operation process, or the like) by the bus traffic level (preferably, an arbitration operation that gives priority to the MFP operation process over the server operation process) may be performed. Since the total memory bandwidth (actual value) of the four channels Ch1 to Ch4 is 4.0 GB/s, the required bandwidth (3.2 GB/s) for the operation mode D5 (the required bandwidth for the MFP operation) is ensured by this assignment.

Further, when it is determined that the operation mode of the MFP 10 is the operation mode D1, one DRAM 51$a$ (in other words, one channel Ch1) is assigned to the MFP operation. Four DRAMs 51$a$, 51$b$, 51$c$, and 51$d$ (in other words, four channels Ch1, Ch2, Ch3, and Ch4) are assigned to the server operation. In the operation mode D1, the DRAM 51$a$ (in other words, the channel Ch1) is shared by the MFP operation and the server operation. As to the DRAM 51$a$ which is shared, the arbitration operation for determining the priority of each process by the bus traffic level (preferably, the arbitration operation that gives priority to the MFP operation process over the server operation process) may be performed.

Furthermore, in any one of the operation modes D1 to D5, if the DRAM assigned to the server operation (in other words, the channel assigned to the server operation) lacks processing capability (memory bandwidth), not only the assigned DRAM but also a virtual memory (HDD or the like) may be used together for the server operation. Further, since the assignment (regarding the DRAM) as to the MFP operation is changed in accordance with the current operation mode of the MFP, there is basically no case where the DRAM assigned to the MFP operation (in other words, the assigned channel) lacks processing capability (memory bandwidth). If the DRAM lacks processing capability as to the MFP operation, however, similarly, the virtual memory (HDD or the like) may be also used for the MFP operation.

Thus, in accordance with the required bandwidth in each of the operation modes D1 to D5, the channel to be used as the channel for first function (channel for MFP operation) among the plurality of channels Ch1 to Ch4 is changed in stages. In other words, the channel to be used as the channel for first function among the plurality of channels Ch1 to Ch4 is changed in accordance with one of a plurality of stages regarding the required bandwidth ("0.2", "0.5", "1.5", "2.5", and "3.2" (GB/s)). In more detail, as the "required bandwidth" estimated in accordance with each operation mode becomes larger, the first function only channel (MFP operation only channel) (in more detail, the bandwidth thereof) is expanded.

<1-4. Operation>

Figure 5:
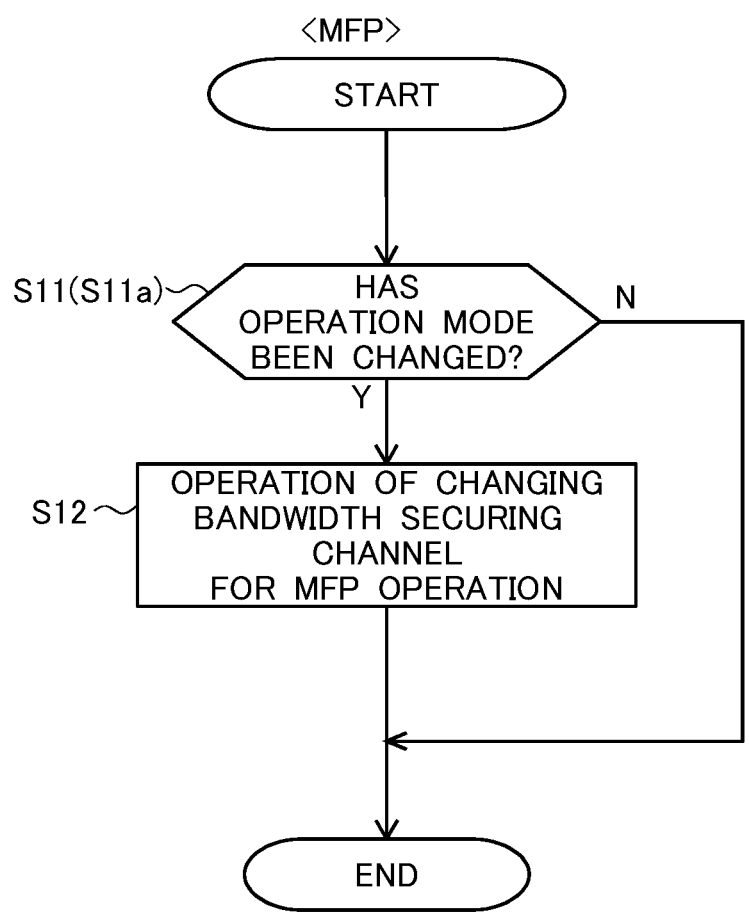
FIG. 5 is a flowchart showing an operation of the MFP.

Next, an authentication operation and the like of the MFP 10 will be described with reference to the flowchart of FIG. 5 and the like.

First, in Step S11, the CPU 31 determines whether the operation mode has been changed or not. Specifically, a comparison between the current operation mode (the latest operation mode) and the operation mode until then is performed. When the current operation mode is different from the operation mode until then, it is determined that the operation mode has been changed, and the process goes to Step S12.

The current operation mode is determined on the basis of an operation which is actually performed by the MFP 10, and the like.

When the MFP 10 is in a standby state, for example, it is determined that the MFP 10 has the operation mode D1. After that, when the print request is received, for example, it is determined that the operation mode has been changed to the operation mode D3. Further, during the execution of the print job in accordance with the print request, it is determined that the MFP 10 continuously has the operation mode D3. Furthermore, when the print job is finished, the operation mode of the MFP 10 is updated (for example, the operation mode returns to the operation mode D1).

In Step S12, the CPU 31 estimates a required bandwidth for the MFP operation (a memory bandwidth required for the MFP operation) on the basis of the operation mode after being changed, and determines a "channel for MFP operation" and a "channel for server operation" on the basis of the estimation result.

When the operation mode has been changed from the operation mode D1 to the operation mode D3, for example, it is estimated that the required bandwidth for the MFP operation is "1.5 GB/s" (see FIG. 4). Then, on the basis of the estimated required bandwidth, among the plurality of channels Ch1 to Ch4, the channels Ch1 and Ch2 are determined as the "channel for MFP operation" (MFP operation only channel) and the channels Ch3 and Ch4 are determined as the "channel for server operation" (server operation only channel) (see FIG. 4).

Figure 7:
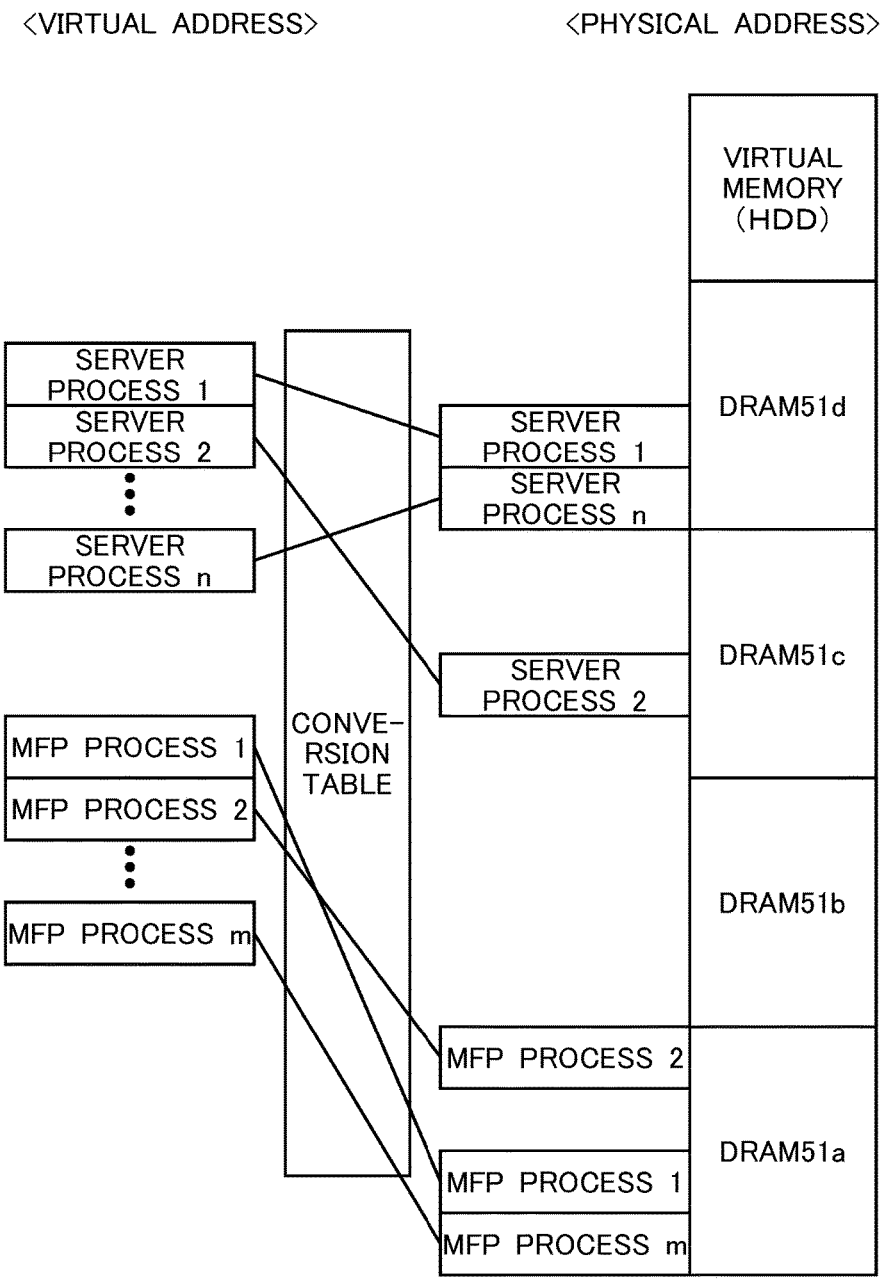
FIG. 7 is a view showing allocation of processes or the like (after the move) in the memory.

Further, the CPU 31 performs the MFP operation by using the determined "MFP operation only channel" and performs the server operation by using the determined "server operation only channel" (see FIG. 7).

In more detail, immediately after the mode transition (mode change), the CPU 31 determines whether or not each "server process" is left in the DRAM 51$a$ or 51$b$ (the DRAM corresponding to the channel Ch1 or Ch2 (the MFP operation only channel)). Specifically, the application program executed by the CPU 31 acquires a process ID of each server process and acquires the physical address and the like used in the process indicated by the process ID by inquiry to the OS, and determines whether or not the physical address is an address in the DRAM 51$a$ or 51$b$.

When the process for the server operation (and data for the server operation) is left in the DRAM 51$a$ or 51$b$ (the DRAM corresponding to the channel Ch1 or Ch2 (the MFP operation only channel) immediately after the mode transition, first, the process for the server operation (and the data thereof) is moved to the DRAM 51$c$ or 51$d$ (the DRAM corresponding to the channel Ch3 or Ch4 (the server operation only channel) or the virtual memory (HDD or the like).

Figure 6:
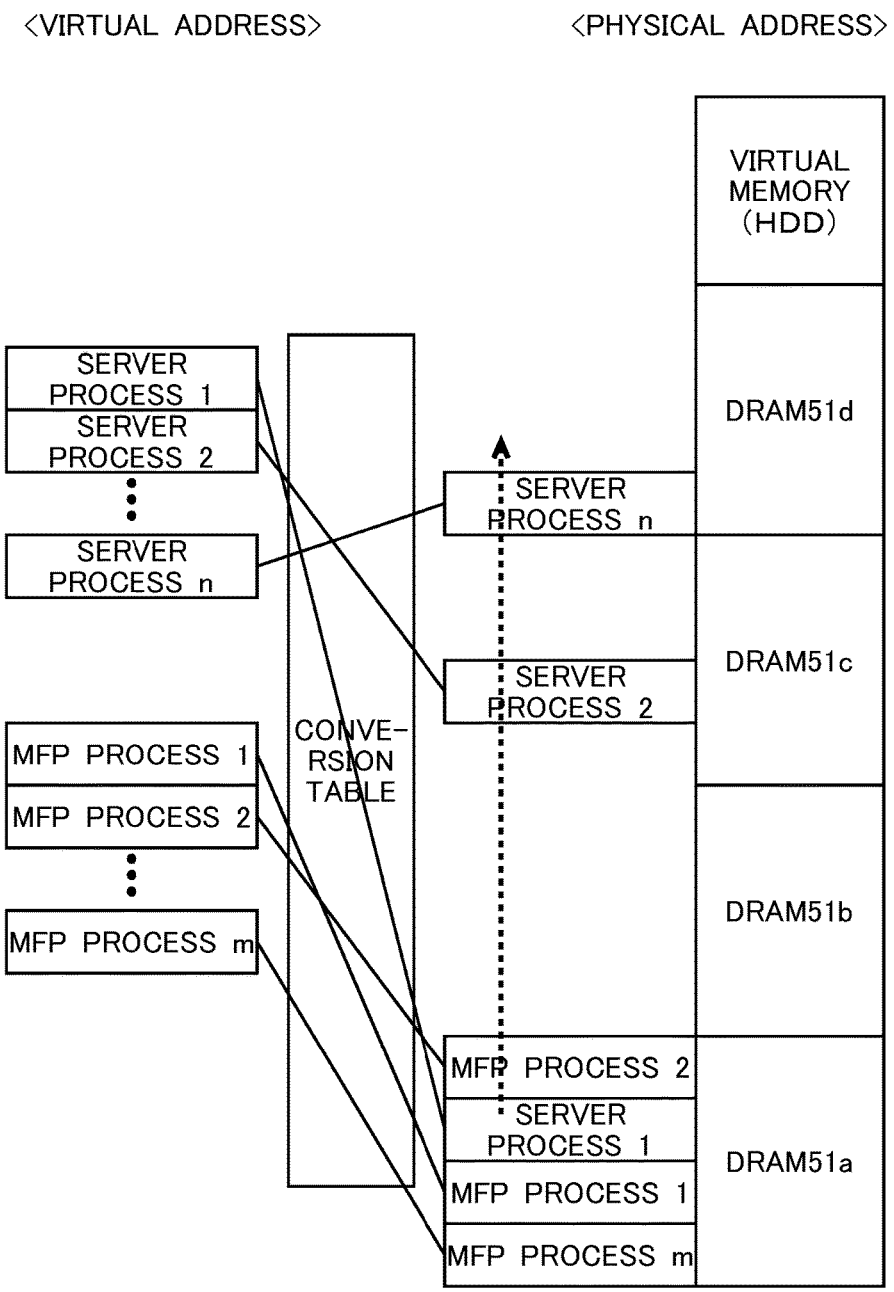
FIG. 6 is a view showing allocation of processes or the like (before a move) in a memory.

When a "server process 1" is present in the DRAM 51$a$ as shown in FIG. 6 immediately after the transition to the operation mode D3, for example, the "server process 1" (and the data thereof) is moved to the DRAM 51$d$ (see FIG. 7). Further, it is assumed that each "process" (a server process or an MFP process) shown in FIG. 6 includes both a program itself of the process and data used in the process.

Such a move operation is achieved when an application transmits a move command indicating that the "server process 1" should be moved into the DRAM 51$c$ or 51$d$, to the OS, and so on. Further, as to other "server processes", similarly, the move command may be given. In response to the move command, the OS moves the "server process" (and the data thereof) which is present in the DRAM 51$a$ or 51$b$ to the DRAM 51$c$ or 51$d$ or the virtual memory (HDD or the like).

Furthermore, in a case where the operation mode has been changed from the operation mode D5 to the operation mode D3, or the like case, immediately after the mode transition, conversely, a process for the MFP operation (and data for the MFP operation) is sometimes left in the DRAM 51$c$ or 51$d$ (the DRAM corresponding to the channel Ch3 or Ch4 (the server operation only channel)). In such a case, first, the process for the MFP operation (and the data thereof) may be moved to the DRAM 51$a$ or 51$b$ (the DRAM corresponding to the channel Ch1 or Ch2 (the MFP operation only channel)).

Such a move operation is achieved when the application transmits a move command indicating that the "MFP process" should be moved into the DRAM 51a or 51b, to the OS, and so on. In response to the move command, the OS moves the "MFP process" (and the data thereof) which is present in the DRAM 51c or 51d to the DRAM 51a or 51b.

When the operation in Step S12 is finished, each process is performed.

When the process for the MFP operation is performed by any one of the CPU cores 31a to 31d, for example, the process for the MFP operation is performed by using the DRAM 51a or 51b (the DRAM corresponding to the channel Ch1 or Ch2 (the MFP operation only channel)). In detail, in the process for the MFP operation, the transmission and reception of data (including a writing process and/or a read-out process on the DRAM 51a or 51b) is performed by using the DRAM 51a or 51b. Further, the process for the MFP operation includes a process (also referred to as a "DMA process") of performing transmission and reception of data between the DMA controller 41 and the image processing circuit 43 by using the DRAM (51a, 51b, or the like), not by using the CPU 31.

Such an execution operation of the process for the MFP operation is achieved when the application transmits an execution command indicating that the process for the MFP operation should be performed by using the DRAM 51a or 51b (in other words, the channel Ch1 or Ch2), to the OS, and so on.

Further, as to the process for the server operation, similarly, the execution command may be given. Specifically, such an execution operation of the process for the server operation is achieved when the application transmits the execution command indicating that the process for the server operation should be performed by using the DRAM 51c or 51d (in other words, the channel Ch3 or Ch4), to the OS, and so on.

Thus, the MFP operation is performed by using the channel (the channel for MFP operation (MFP operation only channel or the like)) determined in accordance with the operation mode, and the server operation is performed by using the channel (the channel for server operation (server operation only channel or the like)) determined in accordance with the operation mode.

In the above-described operation, the memory bandwidth required for the execution operation of the first function including the image processing function (the required bandwidth) is estimated on the basis of the current operation mode of the MFP 10. Then, on the basis of the estimated required bandwidth, the channel for MFP operation (particularly, the MFP operation only channel) and the server operation only channel (the second function only channel) are determined. Therefore, in the image processing apparatus which performs the image processing function and the server function in parallel, it is possible to effectively use the shared memory (any of the DRAMs 51a to 51d) and suppress a delay in the operation regarding the image processing function. In more detail, since the MFP operation only channel is not used for the server operation, it is possible to more reliably ensure the required bandwidth of the execution operation of the first function (the MFP operation) and avoid or suppress an increase in the required time for the MFP operation and the user's waiting time. When a user performs one of various jobs, such as copy or the like, in the MFP, for example, it is possible to avoid or suppress the required time for the job from becoming longer than usual.

Particularly, in each of the operation modes (especially, the operation modes D2 to D5), even when a load regarding the server operation increases, the server operation is performed by using a memory for the server operation, the virtual memory, or the like while the MFP operation only channel is ensured for the MFP operation. Therefore, even when the load regarding the server operation increases, it is possible to suppress an effect to be produced on the MFP operation.

Further, the MFP operation only channel is not fixed and changed as appropriate in accordance with the current operation mode. Therefore, it is possible to more appropriately ensure the bandwidth for the MFP operation also in consideration of the more or less of the quantity of MFP operations and the like, as compared with a case where a plurality of channels are allocated to the MFP operation and the server operation always at the same ratio.

Particularly, since the MFP operation only channel (in more detail, the bandwidth thereof) is expanded as the required bandwidth estimated in accordance with the operation mode (the required bandwidth for the MFP operation) becomes larger, it is possible to more appropriately ensure the bandwidth for the MFP operation.

Further, in the above-described first preferred embodiment, since the MFP operation only channel is determined before starting the execution of a new job regarding the MFP operation, it is possible to ensure an appropriate bandwidth for the execution of the new job in advance (at an early stage).

Furthermore, in the above-described first preferred embodiment, the MFP operation only channel is determined in some of the operation modes (specifically, the "operation mode D1"). Thus, it is not always necessary to determine the MFP operation only channel. This is, however, only one exemplary case, and the MFP operation only channel may be always determined in all the operation modes, not depending on the operation mode. In the operation mode D1, for example, the MFP operation only channel (and the server operation only channel) which is the same as that in the operation mode D2 may be determined.

<2. The Second Preferred Embodiment>

The above-described first preferred embodiment shows the exemplary case where the required bandwidth for the MFP operation is estimated in accordance with the current operation mode of the MFP 10.

In the second preferred embodiment, an exemplary case where the required bandwidth for the MFP operation is estimated on the basis of an operation state of a user on the MFP 10 will be shown.

Figure 8:
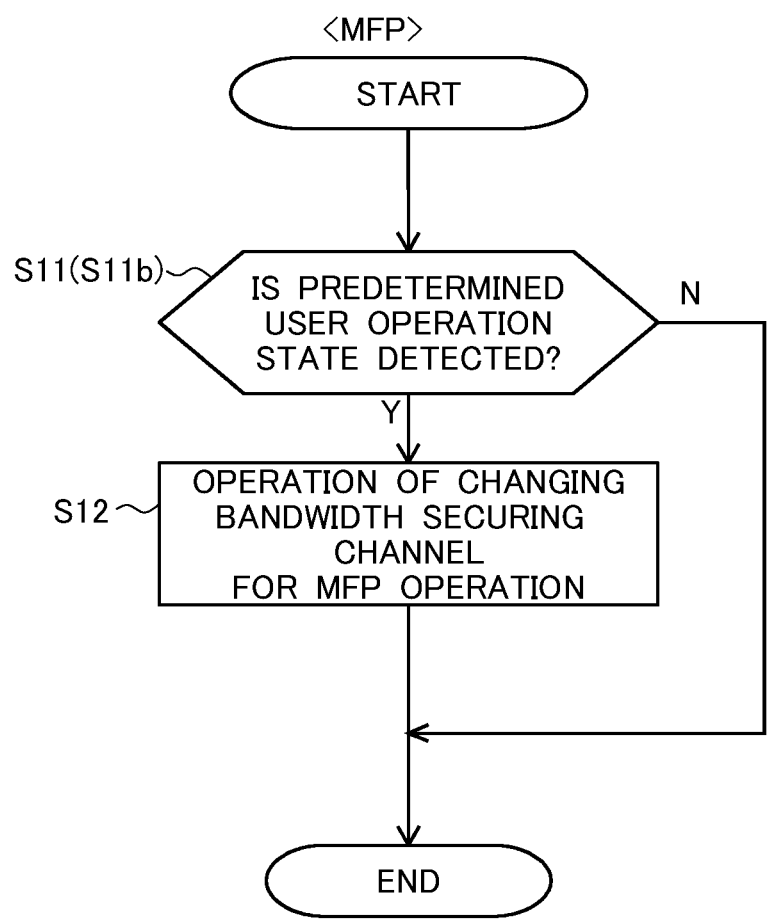
FIG. 8 is a flowchart showing an operation in accordance with a second preferred embodiment.

FIG. 8 is a flowchart showing an operation in accordance with the second preferred embodiment.

As shown in FIG. 8, in Step S11b, it is determined whether a predetermined user operation state (see FIG. 9) is detected or not. Then, in Step S12, the required bandwidth for the MFP operation is estimated on the basis of the detected user operation state, and on the basis of the estimation result, an operation of ensuring the memory bandwidth and the like are performed. Further, the second preferred embodiment is a variation of the first preferred embodiment, and hereinafter, description will be made, centering on the difference between the first and second preferred embodiments.

Figure 9:
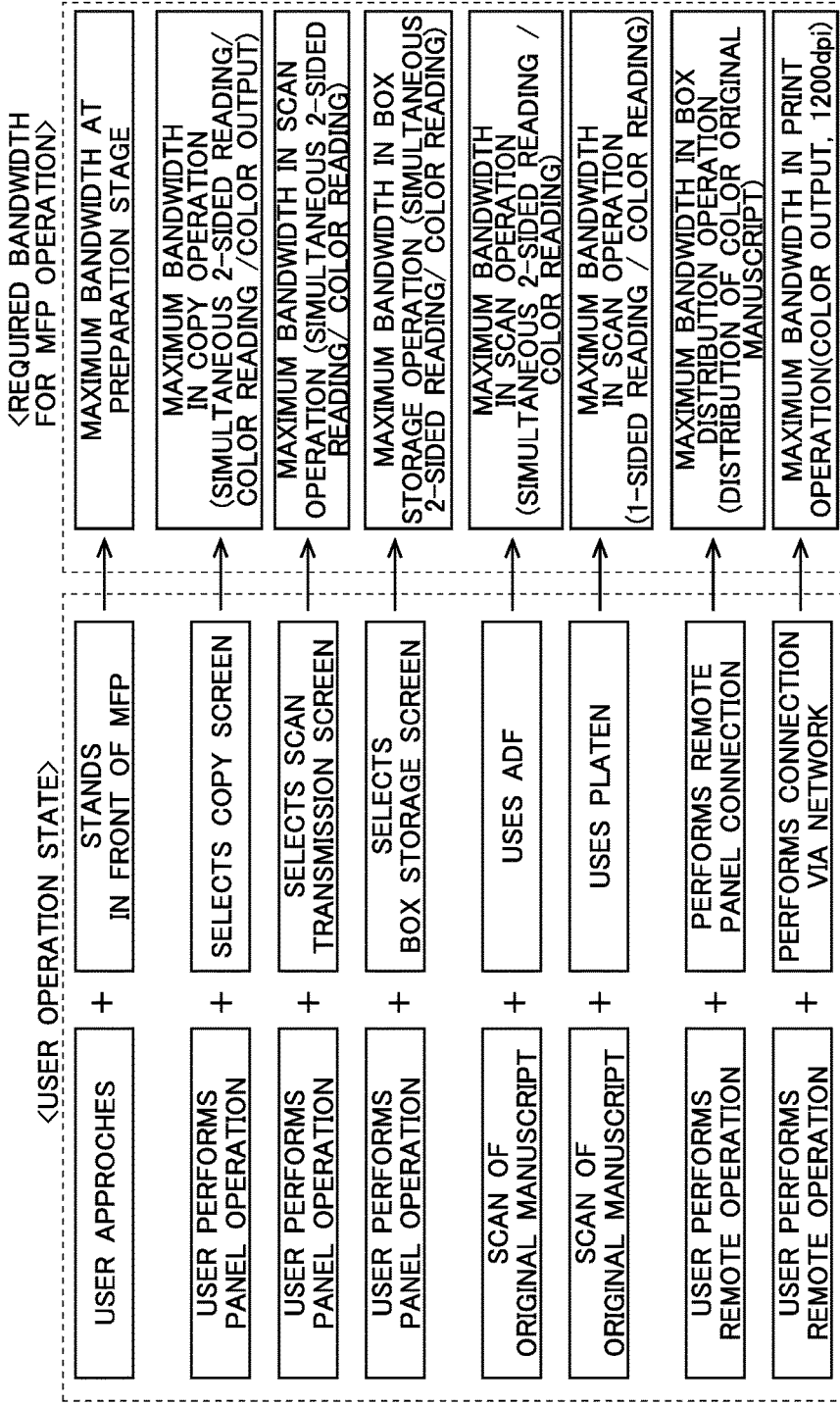
FIG. 9 is a view showing a relation between operation states of a user and required bandwidths estimated for the operation states.

FIG. 9 is a view showing a relation between a user operation state and the required bandwidth to be estimated for the operation state. As shown in FIG. 9, in the second preferred embodiment, the required bandwidth for the MFP operation at the present time or near future (after a predetermined time (for example, several seconds to several ten seconds) elapses) is estimated on the basis of the user operation state, instead of the operation mode.

When a user operation state ("user approach") indicating that "a user approaches the MFP 10 and then stands in front of the MFP 10 (and does not start any panel operation yet)" is detected, for example, the MFP 10 determines that there is a high possibility that a panel operation of the MFP 10 will be started by the user. Further, the user approach and the like may be detected by an approach detection sensor or the like provided in the MFP 10.

When the "user approach" is detected, the MFP 10 determines that there is a high possibility that a panel operation will be performed. Then, the MFP 10 obtains a bandwidth (required bandwidth) required for a "moving image streaming operation using a browser" which is an operation requiring the largest bandwidth among operations accompanied by a panel operation (one of various operations using hardware keys of the operation panel part 6c and/or software keys (inside the touch panel 25) (including a setting operation, a browser operation, and the like). For example, the required bandwidth for the "moving image streaming operation using a browser" is calculated as 0.5 GB/s. Then, the value (0.5 GB/s) is estimated as the "required bandwidth" for the MFP operation at the present time or near future, and a channel for ensuring the required bandwidth is assigned to the MFP operation. More specifically, N channels (in a unit of 1 GB/s) are assigned to the MFP operation so that the channels can have a bandwidth (total bandwidth) larger than the required bandwidth. For example, one channel Ch1 (associated with the DRAM 51a) having a bandwidth (1 GB/s) larger than 0.5 GB/s is assigned to the MFP operation. In other words, the channel Ch1 is determined as the MFP operation only channel (first function only channel). Further, among the plurality of channels, the remaining channels Ch2 to Ch4 are determined as the server operation only channels (second function only channels).

Furthermore, when a user operation state ("start of copy operation") indicating that "the user starts a panel operation and selects a copy setting screen" is detected, the MFP 10 determines that there is a high possibility that the copy operation (an image processing operation accompanied by the scan operation and the print operation, or the like) will be started. When the "start of copy operation" is detected, the MFP 10 obtains the required bandwidth (the maximum bandwidth calculated in advance, or the like) (for example, 2.5 GB/s) required for the "copy operation" which will be performed next with high possibility. When the start of copy operation is detected, herein, the maximum bandwidth which can be used in the copy job (specifically, the maximum bandwidth in setting of "simultaneous 2-sided reading and full color copy" (for example, 2.5 GB/s) (fixed value)) is estimated as the "required bandwidth" for the MFP operation at the present time or near future. Then, N channels (in a unit of 1 GB/s) are assigned to the MFP operation so that the channels can have a bandwidth (total bandwidth) larger than the required bandwidth. For example, three channels Ch1, Ch2, and Ch3 (associated with the DRAMs 51a, 51b, and 51c) having a bandwidth (3 GB/s) larger than 2.5 GB/s are assigned to the MFP operation. In other words, the channels Ch1, Ch2, and Ch3 are determined as the MFP operation only channels (first function only channels). Further, among the plurality of channels, the remaining channel Ch4 is determined as the server operation only channel (second function only channel).

Further, when a user operation state ("start of box storage operation") indicating that "the user starts a panel operation and selects a box storage screen" is detected, the MFP 10 determines that there is a high possibility that the box storage operation (an operation accompanied by the scan operation, or the like) will be started. When the "start of box storage operation" is detected, the MFP 10 obtains the required bandwidth (the maximum bandwidth calculated in advance, or the like) (for example, 2.5 GB/s) required for the "box storage operation" which will be performed next with high possibility. When the start of box storage operation is detected, herein, the maximum bandwidth which can be used in a box storage job (specifically, the maximum bandwidth in setting of "simultaneous 2-sided reading and full color reading" (for example, 2.5 GB/s)) is estimated as the "required bandwidth" for the MFP operation at the present time or near future. Then, N channels (in a unit of 1 GB/s) are assigned to the MFP operation so that the channels can have a bandwidth (total bandwidth) larger than the required bandwidth. For example, totally three channels Ch1, Ch2, and Ch3 (associated with the DRAMs 51a, 51b, and 51c) having a bandwidth (3 GB/s) larger than 2.5 GB/s are assigned to the MFP operation. Further, among the plurality of channels, the remaining channel Ch4 is determined as the server operation only channel (second function only channel).

Furthermore, when a user operation state ("start of scan transmission operation") indicating that "the user starts a panel operation and selects a scan setting screen" is detected, the MFP 10 determines that there is a high possibility that the scan transmission operation (an operation accompanied by the scan operation, or the like) will be started. Then, the estimation operation, the assignment operation, and the like as described above are performed.

Further, when a user operation state ("start of scan operation using ADF") indicating that "the user starts an operation on an ADF (Auto Document Feeder)" is detected, the MFP 10 determines that there is a high possibility that the scan transmission operation (an operation accompanied by the scan operation, or the like) will be started. Then, the estimation operation, the assignment operation, and the like as described above are performed.

Furthermore, when a user operation state ("start of scan operation using document platen") indicating that "the user starts an operation on a document platen (document platen made of glass)" is detected, the MFP 10 determines that there is a high possibility that the scan transmission operation (an operation accompanied by the scan operation, or the like) (however, 1-sided reading operation) will be started. In this case, the required bandwidth (the maximum bandwidth calculated in advance, or the like) (for example, 1.3 GB/s) required for the "scan operation accompanied by the 1-sided reading operation" is obtained. In more detail, the maximum bandwidth which can be used in a 1-sided scan job (specifically, the maximum bandwidth in setting of "1-sided reading and full color reading" (for example, 1.3 GB/s)) is calculated as the "required bandwidth" for the MFP operation at the present time or near future. Then, N channels (in a unit of 1 GB/s) are assigned to the MFP operation so that the channels can have a bandwidth (total bandwidth) larger than the required bandwidth. For example, totally two channels Ch1 and Ch2 (associated with the DRAMs 51a and 51b) having a bandwidth (2 GB/s) larger than 1.3 GB/s are assigned to the MFP operation. Further, among the plurality of channels, the remaining channels Ch3 and Ch4 are determined as the server operation only channels (second function only channels).

Further, when a user operation state ("start of remote operation") indicating that "the user starts a connection operation (remote connection operation) to the MFP 10 for the remote operation using a remote operation apparatus (a smartphone or the like)" is detected, the MFP 10 determines that there is a high possibility that a distribution operation of box data (a transmission operation of data stored in a box, or the like) will be started. In this case, the required bandwidth (the maximum bandwidth calculated in advance, or the like) required for the "distribution operation of box data" is obtained. Then, N channels are assigned to the MFP operation so that the channels can have a bandwidth (total bandwidth) larger than the required bandwidth (the required bandwidth for the MFP operation at the present time or near future). Further, among the plurality of channels, the remaining channels are determined as the server operation only channels (second function only channels).

Furthermore, when a user operation state ("start of network print operation") indicating that "the user starts a print request to the MFP 10 via a network" is detected, the MFP 10 determines that there is a high possibility that a print-out operation (a print-out operation regarding data received via the network, or the like) will be started. Specifically, when the MFP 10 receives a print request to the MFP 10 from a client computer of the user, "start of network print operation" is detected. In this case, the required bandwidth (the maximum bandwidth calculated in advance, or the like) required for the "print operation" is obtained. When the start of network print operation is detected, the maximum bandwidth which can be used in a network print job (specifically, the maximum bandwidth in setting of "full color print and high quality output (1200 dpi output)" (for example, 1.5 GB/s)) is calculated as the "required bandwidth" for the MFP operation at the present time or near future. Then, N channels are assigned to the MFP operation so that the channels can have a bandwidth (total bandwidth) larger than the required bandwidth. In other words, the N channels are determined as the MFP operation only channels (first function only channels). Further, among the plurality of channels, the remaining channels are determined as the server operation only channels (second function only channels).

In the above-described operation, the memory bandwidth required for the execution operation of the first function including the image processing function (the required bandwidth) is estimated on the basis of the user operation state on the MFP 10. Then, on the basis of the estimated required bandwidth, the channel for MFP operation (particularly, the MFP operation only channel) and the server operation only channel (the second function only channel) are determined. Therefore, in the image processing apparatus which performs the image processing function and the server function in parallel, it is possible to effectively use the shared memory (any of the DRAMs 51a to 51d) and suppress a delay in the operation regarding the image processing function. In more detail, it is possible to more reliably ensure the required bandwidth of the execution operation of the first function (the MFP operation) and avoid or suppress an increase in the required time for the MFP operation and the user's waiting time. When a user performs one of various jobs, such as copy or the like, in the MFP, for example, it is possible to avoid or suppress the required time for the job from becoming longer than usual.

<Variations of the Second Preferred Embodiment>

Herein, through the required bandwidth for each of the copy operation, the scan operation, and the print operation may be determined in advance as a fixed value (certain value not depending on the setting content) as described above, the required bandwidth may be calculated (estimated) on the basis of the setting content (set value) regarding each operation as described below.

As to the copy operation (copy job), for example, the required bandwidth may be calculated on the basis of one of various setting contents shown in FIG. 10 (in detail, respective set values (elements) of "size and orientation of original manuscript", "size and orientation of output paper", "zoom", "color mode", and "original manuscript mode").

Specifically, since a compression ratio of an image varies depending on which is the "original manuscript mode", "text", "map", or "picture", a data size of the generated image also varies. In a case where "text" is set, the data size of the image is smaller than that in another case where "map" or "picture" is set, and only a relatively small required bandwidth is needed. On the other hand, in a case where "picture" is set, the data size of the image is larger than that in another case where "map" or "text" is set, and a relatively large required bandwidth is needed.

Further, the data size of the generated image varies depending on which is the "color mode", "full color" or "monochrome". In a case where "full color" is set, the data size of the image is larger than that in another case where "monochrome" is set, and a relatively large required bandwidth is needed.

Furthermore, the data size of the generated image varies depending on the "size of original manuscript" and the "size of output paper". For this reason, the required bandwidth varies depending on these elements. Further, the required bandwidth varies also depending on the "orientation of original manuscript" and the "orientation of output paper". In a case where the original manuscript is "A4/horizontal" and the output paper is "A4/vertical" (in short, a case accompanied by "rotation" from the horizontal orientation to the vertical orientation), the required bandwidth is needed to be relatively larger than that in another case not accompanied by "rotation".

Further, the required bandwidth varies also depending on which is the "zoom", "same size", "X0.7 (reduced size)", or "X1.4 (enlarged size)", or the like.

In detail, the required bandwidth may be calculated on the basis of a predetermined calculation equation reflecting the variation in accordance with these various elements, or the like.

Similarly, as to the scan operation (scan job), the required bandwidth may be calculated on the basis of one of various setting contents shown in FIG. 10 (in detail, respective set values (elements) of "size and orientation of original manuscript", "size and orientation of transmission", "resolution", "color mode", and "transmission format"). For example, the required bandwidth varies also depending on which is the "resolution", "600 dpi" or "300 dpi". Further, the required bandwidth varies also depending on which is the "transmission format" (format of transmission object file), "RAW", "JPEG", or "PDF".

Similarly, as to the print operation (print job), the required bandwidth may be calculated on the basis of one of various setting contents shown in FIG. 10 (in detail, respective set values (elements) of "size and orientation of original manuscript", "size and orientation of output paper", "resolution", "color mode", and "image quality"). For example, the required bandwidth varies also depending on which is the "resolution", "1200 dpi" or "600 dpi". Further, the required bandwidth varies also depending on which is the "image quality", "high", "middle", or "low".

As to the copy job and the scan job, in the execution of each job, at the point in time for the setting operation (at the point in time for the copy setting operation or at the point in time for the scan setting operation), the required bandwidth for each job execution is calculated on the basis of the setting content of the job, and the MFP operation only channel is thereby determined. Then, in the following operation, specifically, in the operation for the execution of each job (for the execution of image processing in each job), the MFP operation only channel may be used.

Further, in the execution of the print operation (print job), at the point in time when setting information regarding the print job is received (at the point in time when the print request including the setting information is received), the required bandwidth for the print job execution is calculated on the basis of the setting information, and the MFP operation only channel is thereby determined. Then, in the following operation, specifically, in the operation for the execution of the print job (for the execution of reception process of the print data described in PDL and image processing regarding the print job), the MFP operation only channel may be used.

In the above-described exemplary cases, since the required bandwidth for the MFP operation is calculated on the basis of the setting content (set value) regarding each job, it is possible to more appropriately obtain the required bandwidth for the MFP operation and further to more appropriately determine the MFP operation only channel.

>3. The Third Preferred Embodiment>

The third preferred embodiment is a variation of the second preferred embodiment. Hereinafter, description will be made, centering on the difference between the second and third preferred embodiments.

The above-described second preferred embodiment is based on the premise that the compression ratio is a predetermined reference value. On the other hand, in the third preferred embodiment, after the same estimation operation and determination operation as those in the second preferred embodiment are performed, an actual compression ratio regarding a processing object image is obtained and the required bandwidth for the MFP operation is reestimated on the basis of the actual compression ratio. Then, on the basis of the reestimated required bandwidth, the MFP operation only channel and the like are redetermined. Herein, the required bandwidth for the MFP operation largely depends on the compression ratio of the image. In the third preferred embodiment, since the required bandwidth for the MFP operation is reestimated on the basis of the actual compression ratio of the actual processing object image, it is possible to more appropriately determine the MFP operation only channel and the like.

Specifically, in the third preferred embodiment, an actual processing result regarding the processing object image is obtained (herein, the actual compression ratio of data compressed in the image compression process is calculated), and the required bandwidth is corrected on the basis of the processing result (herein, the actual compression ratio).

Then, N channels (in a unit of 1 GB/s) are assigned to the MFP operation so that the channels can have a bandwidth (total bandwidth) larger than the corrected required bandwidth and have a difference within 1 unit amount (herein, 1 GB/s). As a result, in a case where the required bandwidth is largely changed between before and after the correction, and the like case, the value of N is changed. Then, with the change of the value of N, the channel assigned to the MFP operation is changed.

In a case, for example, where the required bandwidth is "2.3 GB/s" and the value of N is determined to be "3" before the correction, when the required bandwidth is changed to "1.8 GB/s" and the value of N is changed to "2", the channels assigned to the MFP operation are changed. Specifically, with such a change, the MFP operation only channels are changed from the three channels Ch1, Ch2, and Ch3 to the two channels Ch1 and Ch2. In other words, the MFP operation only channels are changed from the three channels corresponding to the three DRAMs 51a, 51b, and 51c to the two channels corresponding to two DRAMs 51a and 51b.

In more detail, in the copy operation (copy job), for example, an image input process, a compression process, a decompression process, an output process, and the like are performed in parallel.

FIG. 11 is a view schematically showing a processing (parallel processing) on a memory access in the copy operation. Further, though one image processing circuit 43 and one DMA controller 41 are shown in FIG. 3, a plurality of image processing circuits 43 and a plurality of DMA controllers 41 are actually provided. FIG. 11 shows such a configuration. Specifically, an image processing circuit 43e which performs a scan input process, an image processing circuit 43f which performs an image processing for printout, an image processing circuit (compression circuit) 43a which performs an image compression process, an image processing circuit (decompression circuit) 43c which performs an image decompression process, and the like are provided in the SoC of the controller 9. Further, a DMA controller 41e which controls output data from the image processing circuit 43e and a DMA controller 41f which controls input data to the image processing circuit 43f are provided. Moreover, DMA controllers 41a and 41b which control input data and output data to/from the image processing circuit 43a, respectively, DMA controllers 41c and 41d which control input data and output data to/from the image processing circuit 43c, respectively, and the like are further provided.

When the image reading part (scanning part) 2 (see FIG. 1) and the image processing circuit 43e generate an input image (scan image), the image processing circuit 43e determines which is the type of the input image ("text", "map", or "picture"). The determination result on the type of the input image is acquired by the CPU 31 or the like. Further, the data of the generated input image (scan image) are inputted to the image processing circuit (compression circuit) 43a through the DMA controllers 41e and 41a. Then, the data after being compressed by the image processing circuit (compression circuit) 43a are once stored into the DRAM 51 (for example, one of the DRAMs 51a to 51c) assigned to the MFP operation through the DMA controller 41b and the DRAM controller 36. The compression result on the scan image is acquired by the CPU 31 or the like.

Further, for the print-out in the copy operation or the like, the scan image which is once stored in the DRAM 51 is inputted to the image processing circuit (decompression circuit) 43c through the DMA controller 41c and the DRAM controller 36. Then, the data after being decompressed by the image processing circuit (decompression circuit) 43c are stored into the DRAM 51 again through the DMA controller 41d and the DRAM controller 36. Furthermore, the data after being decompressed are read out from the DRAM 51 and inputted to the image processing circuit 43f through the DMA controller 41f and the DRAM controller 36. Then, the print-out using the data is performed by the image processing circuit 43f and the printing part 3 (see FIG. 1).

These processes (the scan image input process, the compression process, the decompression process, and the output process) can be performed in parallel. Particularly, the decompression process performed by the image processing circuit (decompression circuit) 43*c* and the output process performed by the image processing circuit 43*f* can be performed in parallel.

Herein, the data amount after the compression in accordance with the actual compression result is sometimes changed (particularly, reduced) from the basic data amount (the planned data amount after the compression) based on the initial estimation.

For example, in a case where it is planned that the scan image is compressed to the data amount of 80 MB (in a case, for example, where the assumed compression ratio is 80%) in accordance with the assumption at the time when the required bandwidth (1.5 GB/s) is initially estimated, when the actual data amount after the compression is 20 MB (for example, when the actual compression ratio is 20%), the actual required bandwidth regarding the MFP operation (the copy operation or the like) decreases. In more detail, when the decompression process and the output process are performed in parallel, since the bandwidth required for the decompression process is only about 20/80 (=25%), the total required bandwidth (the actual required bandwidth in consideration of the actual data amount after the compression process) required for the decompression process and the output process also decreases (is reduced to, for example, about 63%). When the original required bandwidth is 1.5 GB/s, the required bandwidth in consideration of the actual data amount after the compression process is reduced to, for example, 0.95 GB/s. When the two channels Ch1 and Ch2 are determined as the MFP operation only channels, corresponding to the original required bandwidth (1.5 GB/s) like in the second preferred embodiment, only one channel Ch1 is redetermined as the MFP operation only channel, corresponding to the updated required bandwidth (1.0 GB/s). In short, the channel Ch2 is released from the (substantial) exclusive use for the MFP operation. Further, conversely, the server operation only channels are changed from the two channels Ch3, Ch4 to the three channels Ch2, Ch3, and Ch4. In other words, the assignment is changed so that a relatively large bandwidth may be assigned to the server operation.

Thus, after the required bandwidth is initially estimated, the required bandwidth is reestimated (recalculated) on the basis of the ratio (for example, 20/80) of the actual value to the assumed value of the compression ratio in the image compression process included in the image processing in the MFP operation, and the channel for MFP operation and the channel for server operation (the MFP operation only channel, the server operation only channel, and the like) are redetermined on the basis of the reestimated required bandwidth.

After the redetermination, the operation (in more detail, the remaining copy operation including the decompression process and the print-out process) based on the redetermined channel may be performed.

Since the channel for MFP operation (particularly, the MFP operation only channel) is thereby redetermined on the basis of the actual value of the compression ratio in the image compression process, it is possible to appropriately change the channel assigned to the MFP operation, reflecting the actual compression ratio. In other words, it is possible to favorably change the assignment balance of the memory bandwidth between the MFP operation and the server operation.

Further, though not shown herein, an image processing circuit 43*g* (not shown) which receives the print data or the like is provided in the controller 9 (in the SoC). Then, in the print operation, a print data reception process, the compression process, the decompression process, the output process, and the like are performed in parallel. Also in the print operation and the like, like in the above-described case, the channel for MFP operation (particularly, the MFP operation only channel) and the like may be redetermined on the basis of the actual compression ratio.

<4. The Fourth Preferred Embodiment>

The fourth preferred embodiment is a variation of the third preferred embodiment. Hereinafter, description will be made, centering on the difference between the third and fourth preferred embodiments.

In the third preferred embodiment, the actual compression ratio regarding the processing object image is obtained and the required bandwidth for the MFP operation is reestimated on the basis of the actual compression ratio.

In the fourth preferred embodiment, an image type determination result ("text", "map", "picture") of the processing object image is obtained, the compression ratio is estimated on the basis of the determination result, and the required bandwidth for the MFP operation is reestimated on the basis of the estimated compression ratio.

Herein, when the scan image is a "text" image (a business document having a lot of characters, or the like), a relatively high compression ratio can be achieved. On the other hand, when the scan image is a "picture" image, the compression ratio of the scan image has a relatively low value. In the fourth preferred embodiment, by using such characteristics, the required bandwidth for the MFP operation is reestimated on the basis of the determination result on the image type regarding the processing object image.

In the fourth preferred embodiment, the processing result regarding the processing object image (specifically, the type determination result of the processing object image) is actually obtained, and the required bandwidth is corrected on the basis of the processing result (determination result). After that, the same operation as that in the third preferred embodiment is performed.

As described above, the data amount after the compression in accordance with the actual compression result is sometimes changed (particularly, reduced) from the basic data amount (the planned data amount after the compression) based on the initial estimation.

An exemplary case is assumed where the required bandwidth (1.5 GB/s) is obtained on the premise that the processing object image is a "picture" image, in other words, the compression is performed with a compression ratio (having a relatively high value) (for example, 80%) where the degree of compression is relatively low. In this case, when a determination result indicating that the actual processing object image is a "text" image is obtained, there is a high possibility that the compression can be achieved with a compression ratio (having a relatively low value) (for example, 20%) where the degree of compression is relatively high. In such a case, like in the third preferred embodiment, for example, the total required bandwidth (the actual required bandwidth in consideration of the actual data amount after the compression) required for the decompression process and any other process (the output process or the like) is reduced.

In the fourth preferred embodiment, by using such characteristics, after the required bandwidth is initially estimated, the required bandwidth is reestimated on the basis of the determination result obtained in the image type determination process included in the image processing in the MFP operation. Then, the channel for MFP operation and the channel for server operation (the MFP operation only channel, the server operation only channel, and the like) are redetermined on the basis of the reestimated required bandwidth.

Since the channel for MFP operation (particularly, the MFP operation only channel) is thereby redetermined on the basis of the actual determination result in the image determination process, it is possible to appropriately change the channel assigned to the MFP operation, reflecting the actual image type. In other words, it is possible to favorably change the assignment balance of the memory bandwidth between the MFP operation and the server operation.

<5. Variations, Etc.>

Though the preferred embodiments of the present invention have been described above, the present invention is not limited to the above-described exemplary cases.

Though the exemplary case where the plurality of CPU cores share the plurality of memories (DRAMs 51) has been discussed in the above-described preferred embodiments, for example, the present invention is not limited to this case, and the above-described idea may be applied to a case where a single CPU core shares the plurality of memories (the DRAMs 51 or the like).

Further, though the required bandwidth is directly estimated on the basis of the user operation state in the above-described second preferred embodiment, the present invention is not limited to this case. There may be a case, for example, where the operation mode (the operation mode at the present time or near future) is once determined on the basis of the user operation state and then the required bandwidth is estimated on the basis of the operation mode. Then, like in the first preferred embodiment, the channel for MFP operation and the channel for server operation may be determined on the basis of the estimated required bandwidth (see FIG. 4).

When the "user approach" is detected, for example, there may be a case where it is determined that the operation mode has been changed to the operation mode D2 (FIG. 4) and the required bandwidth corresponding to the operation mode D2 is estimated.

Further, when the user operation state of "start of network print operation" is detected, there may be a case where it is determined that the operation mode has been changed to the operation mode D3 and the required bandwidth corresponding to the operation mode D3 is estimated.

Furthermore, when the user operation state of "start of copy operation" is detected, there may be a case where it is determined that the operation mode has been changed to the operation mode D4 and the required bandwidth corresponding to the operation mode D4 is estimated. Further, when the user operation state of "start of scan transmission operation", "start of scan operation using ADF", or "start of scan operation using document platen" is detected, there may be a case where it is determined that the operation mode has been changed to the operation mode D4 and the required bandwidth corresponding to the operation mode D4 is estimated.

Further, when the user operation state of "start of copy operation" is detected during reception of the print data, there may be a case where it is determined that the operation mode has been changed to the operation mode D5 and the required bandwidth corresponding to the operation mode D5 is estimated.

Furthermore, though the above-described third and fourth preferred embodiments have been described as the preferred embodiments in combination with the second preferred embodiment, the present invention is not limited to these cases. For example, the above-described third and fourth preferred embodiments may be each achieved as the preferred embodiment in combination with the first preferred embodiment. Specifically, there may be a case where the MFP operation only channel and the like are determined on the basis of the operation mode like in the first preferred embodiment and then the MFP operation only channel and the like are redetermined on the basis of the reestimated required bandwidth like in the third or fourth preferred embodiment.

Although embodiments of the present invention have been described and illustrated in detail, it is clearly understood that the same is by way of illustration and example only and not limitation, the scope of the present invention should be interpreted by terms of the appended claims.

What is claimed is:

1. An image processing apparatus comprising:
a plurality of memories; and
a hardware processor which controls an execution operation of a first function including an image processing function and an execution operation of a second function including a server function, by using said plurality of memories,
said image processing apparatus capable of operating in any of a plurality of operation modes,
wherein said hardware processor estimates a required bandwidth which is a memory bandwidth required for said execution operation of said first function on the basis of a current operation mode of said image processing apparatus among said plurality of operation modes,
determines and assigns one or more bandwidth securing channels out of a plurality of channels used to access said plurality of memories for said first function, wherein at least one bandwidth securing channel is a channel capable of being used exclusively for said execution operation of said first function and incapable of being used for said execution operation of said second function, on the basis of said required bandwidth,
determines and assigns one or more bandwidth securing channel out of the plurality of channels for said second function, and
executes said first function and said second function in parallel,
wherein, when the required bandwidth does not require said plurality of memories for the first function, the bandwidth securing channel for the second function is distinct from the one or more bandwidth securing channels for said first function,
and wherein, when at least one bandwidth securing channel must be shared between said first function and said second function, an arbitration operation determines a priority of said first function and said second function, and executes said first function and said second function based on the priority.

2. The image processing apparatus according to claim 1, wherein
said hardware processor changes a channel capable of being used for said execution operation of said first function among a plurality of channels in accordance with a plurality of stages regarding said required bandwidth.

3. The image processing apparatus according to claim 2, wherein
said hardware processor determines said bandwidth securing channel for first function out of said plurality of channels at least one stage among said plurality of stages regarding said required bandwidth.

4. The image processing apparatus according to claim 3, wherein
said hardware processor determines said bandwidth securing channel for first function out of said plurality of channels at two or more stages among said plurality of stages regarding said required bandwidth, and
expands said bandwidth securing channel for first function as said required bandwidth becomes larger.

5. The image processing apparatus according to claim 1, wherein
said hardware processor determines said bandwidth securing channel for first function before starting an execution of a new job regarding said first function.

6. The image processing apparatus according to claim 1, wherein
after estimation of said required bandwidth, said hardware processor reestimates said required bandwidth on the basis of an actual compression ratio of data compressed in an image compression process regarding said image processing function and redetermines said bandwidth securing channel for first function on the basis of said required bandwidth after being reestimated.

7. The image processing apparatus according to claim 1, wherein
after estimation of said required bandwidth, said hardware processor reestimates said required bandwidth on the basis of a determination result in an image type determination process regarding said image processing function and redetermines said bandwidth securing channel for first function on the basis of said required bandwidth after being reestimated.

8. A method of controlling an image processing apparatus which controls an execution operation of a first function including an image processing function and an execution operation of a second function including a server function by using a plurality of memories, to perform:
a) estimating a required bandwidth which is a memory bandwidth required for said execution operation of said first function on the basis of a current operation mode of said image processing apparatus among a plurality of operation modes of said image processing apparatus;
b) determining and assigning one or more bandwidth securing channels out of a plurality of channels used to access said plurality of memories for said first function, wherein at least one bandwidth securing channel is a channel capable of being used exclusively for said execution operation of said first function and incapable of being used for said execution operation of said second function, on the basis of said required bandwidth;
c) determining and assigns one or more bandwidth securing channel out of the plurality of channels for said second function; and
d) executing said first function and said second function in parallel,
wherein, when the required bandwidth does not require said plurality of memories for the first function, the bandwidth securing channel for the second function is distinct from the one or more bandwidth securing channels for said first function,
and wherein, when at least one bandwidth securing channel must be shared between said first function and said second function, an arbitration operation determines a priority of said first function and said second function, and executes said first function and said second function based on the priority.

9. A non-transitory computer-readable recording medium for recording therein a computer program which causes a computer controlling said image processing apparatus, to execute the method as defined in claim 8.

10. An image processing apparatus comprising:
a plurality of memories; and
a hardware processor which controls an execution operation of a first function including an image processing function and an execution operation of a second function including a server function, by using said plurality of memories,
wherein said hardware processor estimates a required bandwidth which is a memory bandwidth required for said execution operation of said first function on the basis of an operation state of a user on said image processing apparatus,
determines and assigns one or more bandwidth securing channels out of a plurality of channels used to access said plurality of memories for said first function, wherein at least one bandwidth securing channel is a channel capable of being used exclusively for said execution operation of said first function and incapable of being used for said execution operation of said second function, on the basis of said required bandwidth,
determines and assigns one or more bandwidth securing channel out of the plurality of channels for said second function, and
executes said first function and said second function in parallel,
wherein, when the required bandwidth does not require said plurality of memories for the first function, the bandwidth securing channel for the second function is distinct from the one or more bandwidth securing channels for said first function,
and wherein, when at least one bandwidth securing channel must be shared between said first function and said second function, an arbitration operation determines a priority of said first function and said second function, and executes said first function and said second function based on the priority.

11. The image processing apparatus according to claim 10, wherein
said operation state of said user includes any of:
a state where said user approaches said image processing apparatus and then is present in front of said image processing apparatus;
a state where said user starts a panel operation of said image processing apparatus and selects a copy setting screen in said panel operation;
a state where said user starts a panel operation of said image processing apparatus and selects a scan setting screen in said panel operation;
a state where said user starts an operation on an automatic document feeding mechanism of said image processing apparatus;
a state where said user starts an operation on a document platen of said image processing apparatus;
a state where said user starts a panel operation of said image processing apparatus and selects a box storage screen in said panel operation;
a state where said user starts connection to said image processing apparatus for remote operation; and a state where said user starts a print request to said image processing apparatus via a network.

12. The image processing apparatus according to claim 10, wherein
said operation state of said user includes a state where said user starts a panel operation of said image processing apparatus and selects a copy setting screen in said panel operation.

13. The image processing apparatus according to claim 12, wherein
said hardware processor estimates said required bandwidth on the basis of a setting content regarding a copy job.

14. The image processing apparatus according to claim 12, wherein
after estimation of said required bandwidth, said hardware processor reestimates said required bandwidth on the basis of an actual compression ratio of data compressed in an image compression process regarding said image processing function and redetermines said bandwidth securing channel for first function on the basis of said required bandwidth after being reestimated.

15. The image processing apparatus according to claim 12, wherein
after estimation of said required bandwidth, said hardware processor reestimates said required bandwidth on the basis of a determination result in an image type determination process regarding said image processing function and redetermines said bandwidth securing channel for first function on the basis of said required bandwidth after being reestimated.

16. The image processing apparatus according to claim 10, wherein
said operation state of said user includes any of:
a state where said user starts a panel operation of said image processing apparatus and selects a scan setting screen in said panel operation;
a state where said user starts an operation on an automatic document feeding mechanism of said image processing apparatus; and
a state where said user starts an operation on a document platen of said image processing apparatus.

17. The image processing apparatus according to claim 16, wherein
said hardware processor estimates said required bandwidth on the basis of a setting content regarding a scan job.

18. The image processing apparatus according to claim 10, wherein
said operation state of said user includes a state where said user starts a print request to said image processing apparatus via a network.

19. The image processing apparatus according to claim 18, wherein
said hardware processor estimates said required bandwidth on the basis of a setting content regarding a print job.

20. The image processing apparatus according to claim 10, wherein
said hardware processor determines said bandwidth securing channel for first function before starting an execution of a new job regarding said first function.

21. A method of controlling an image processing apparatus which controls an execution operation of a first function including an image processing function and an execution operation of a second function including a server function by using a plurality of memories, to perform:
a) estimating a required bandwidth which is a memory bandwidth required for said execution operation of said first function on the basis of an operation state of a user on said image processing apparatus;
b) determining and assigning one or more bandwidth securing channels out of a plurality of channels used to access said plurality of memories for said first function, wherein at least one bandwidth securing channel is a channel capable of being used exclusively for said execution operation of said first function and incapable of being used for said execution operation of said second function, on the basis of said required bandwidth;
c) determining and assigns one or more bandwidth securing channel out of the plurality of channels for said second function; and
d) executing said first function and said second function in parallel,
wherein, when the required bandwidth does not require said plurality of memories for the first function, the bandwidth securing channel for the second function is distinct from the one or more bandwidth securing channels for said first function,
and wherein, when at least one bandwidth securing channel must be shared between said first function and said second function, an arbitration operation determines a priority of said first function and said second function, and executes said first function and said second function based on the priority.

22. A non-transitory computer-readable recording medium for recording therein a computer program which causes a computer controlling said image processing apparatus, to execute the method as defined in claim 21.

* * * * *